(12) United States Patent
Aliminati (10) Patent No.: US 10,432,452 B2
(45) Date of Patent: Oct. 1, 2019

(54) SYSTEM AND METHOD FOR ENABLING APPLICATION-TO-APPLICATION COMMUNICATION IN AN ENTERPRISE COMPUTER SYSTEM

(71) Applicant: ORACLE INTERNATIONAL CORPORATION, Redwood Shores, CA (US)

(72) Inventor: Janga Aliminati, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 14/682,665

(22) Filed: Apr. 9, 2015

(65) Prior Publication Data

US 2015/0295770 A1    Oct. 15, 2015

Related U.S. Application Data

(60) Provisional application No. 61/978,713, filed on Apr. 11, 2014.

(51) Int. Cl.
```
H04L 29/06     (2006.01)
H04L 12/24     (2006.01)
H04L 29/08     (2006.01)
H04L 29/12     (2006.01)
```
(52) U.S. Cl.
CPC ...... *H04L 41/0668* (2013.01); *H04L 61/2007* (2013.01); *H04L 67/1097* (2013.01); *H04L 67/2814* (2013.01)

(58) Field of Classification Search
CPC ............. H04L 61/2007; H04L 67/1097; H04L 41/0668; H04L 67/2814
USPC ......................................................... 709/204
See application file for complete search history.

(56) References Cited

U.S. PATENT DOCUMENTS

| | | | | |
|---|---|---|---|---|
| 6,092,096 A | * | 7/2000 | Lewis | ..................... H04L 45/00 370/396 |
| 7,216,225 B2 | * | 5/2007 | Haviv | ................. H04L 63/0227 709/225 |
| 9,128,764 B2 | * | 9/2015 | Kukreja | ................ G06F 9/4443 |
| 2011/0213840 A1 | * | 9/2011 | Boyer | ................ G06F 17/3089 709/205 |

(Continued)

*Primary Examiner* — Moustafa M Meky
*Assistant Examiner* — Elizabeth Kassa
(74) *Attorney, Agent, or Firm* — Tucker Ellis LLP (57) ABSTRACT

In accordance with an embodiment, described herein is a system and method useful in enterprise deployment, for enabling application-to-application communication in an enterprise computer system, for example a middleware machine. The system can include a plurality of application hosts and managed servers which receive requests at an external load balancer, via an Ethernet over InfiniBand (EoIB) network, together with a plurality of web hosts and traffic directors. Each traffic director instance can be associated with a virtual Internet Protocol (VIP) address that is accessible via a high-speed internal InfiniBand (IB) network. Hosted applications within the enterprise computer system can communicate with each other, over the IB network, using a VIP address. Such application-to-application wiring avoids the need to communicate internal application requests via the external load balancer.

17 Claims, 7 Drawing Sheets

(56) References Cited

U.S. PATENT DOCUMENTS

| | | | |
|---|---|---|---|
| 2011/0289512 A1* | 11/2011 | Vecera | G06F 9/505 |
| | | | 719/313 |
| 2012/0072564 A1* | 3/2012 | Johnsen | H04L 12/462 |
| | | | 709/223 |
| 2013/0063767 A1* | 3/2013 | Morris | G06F 3/1206 |
| | | | 358/1.15 |
| 2013/0080901 A1* | 3/2013 | Ahmed | G06F 9/4443 |
| | | | 715/736 |

* cited by examiner

SYSTEM AND METHOD FOR ENABLING APPLICATION-TO-APPLICATION COMMUNICATION IN AN ENTERPRISE COMPUTER SYSTEM

CLAIM OF PRIORITY

This application claims the benefit of priority to U.S. Provisional Application titled "SYSTEM AND METHOD FOR APPLICATION-TO-APPLICATION COMMUNICATION IN A MIDDLEWARE MACHINE ENVIRONMENT", Application No. 61/978,713, filed Apr. 11, 2014, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise computer systems such as middleware machines, and enterprise deployment, and are particularly related to enabling application-to-application communication in such environments.

BACKGROUND

An enterprise computer system, for example an Oracle Exalogic middleware machine, can include a plurality of application hosts and managed servers which receive requests from external clients that are then processed by hosted applications. In some environments, traffic directors receive the requests from an external load balancer, for example via an Ethernet over InfiniBand (EoIB) network, and route the requests to applications, for example via a high-speed internal InfiniBand (IB) network.

However, if a hard partition is used to route requests between particular traffic director instances and application hosts, then an application which needs to communicate with another application at a different host generally cannot communicate its requests completely within the internal IB network, but must instead communicate the requests via the external load balancer and the slower EoIB network. This need to communicate via the external load balancer negatively impacts the speed with which hosted applications can communicate with one another, and reduces overall system performance.

SUMMARY

In accordance with an embodiment, described herein is a system and method useful in enterprise deployment, for enabling application-to-application communication in an enterprise computer system, for example a middleware machine. The system can include a plurality of application hosts and managed servers which receive requests at an external load balancer, via an Ethernet over InfiniBand (EoIB) network, together with a plurality of web hosts and traffic directors. Each traffic director instance can be associated with a virtual Internet Protocol (VIP) address that is accessible via a high-speed internal InfiniBand (IB) network. Hosted applications within the enterprise computer system can communicate with each other, over the IB network, using a VIP address. Such application-to-application wiring avoids the need to communicate internal application requests via the external load balancer.

DETAILED DESCRIPTION

As described above, an enterprise computer system, for example an Oracle Exalogic middleware machine, can include a plurality of application hosts and managed servers which receive requests from external clients that are then processed by hosted applications. In some environments, traffic directors receive the requests from an external load balancer, for example via an Ethernet over InfiniBand (EoIB) network, and route the requests to applications, for example via a high-speed internal InfiniBand (IB) network.

For example, an Exalogic middleware machine can include a plurality of hard-wired processing nodes that are provided as racks within the system. A typical enterprise deployment approach with such a system is to configure a demilitarized zone (DMZ) having one or more web hosts and traffic director instances, each of which is hard-partitioned to an application host having one or more application server instances.

However, when a hard partition is used, although each traffic director instance can communicate with its associated application server instances using the internal IB network, the communications between the various application server instances and their applications must be communicated via the external load balancer and its EoIB network.

For example, in an Exalogic environment that includes a plurality of Service Oriented Architecture (SOA) and Oracle Service Bus (OSB) managed servers, when a SOA application communicates a request to an OSB application at another application host, the SOA application must direct its request via the external load balancer, for example by directing the request to a URL soainternal.mycompany.com, which is then load-balanced to an appropriate traffic director and OSB server instance.

To address this, in accordance with an embodiment, described herein is a system and method useful in enterprise deployment, for enabling application-to-application communication in an enterprise computer system, for example a middleware machine. The system can include a plurality of application hosts and managed servers which receive requests at an external load balancer, via an Ethernet over InfiniBand (EoIB) network, together with a plurality of web hosts and traffic directors. Each traffic director instance can be associated with a virtual Internet Protocol (VIP) address that is accessible via an internal InfiniBand (IB) network. Hosted applications within the enterprise computer system can communicate with each other, over the IB network, using a VIP address. Such application-to-application wiring avoids the need to communicate internal application requests via the external load balancer.

For example, in an Exalogic environment that includes SOA and OSB managed servers, when a SOA application communicates a request to an OSB application at another application host, its request can instead be routed internally within the traffic director environment, using the VIP address.

Since such application-to-application requests are not load-balanced via the external load balancer, and since each original request can potentially generate several additional or subsequent requests, the ability to completely process such application-to-application requests via an internal IB network, significantly improves system performance.

Additionally, in accordance with an embodiment, each VIP address that is enabled on a particular traffic director instance can be defined within a pair or failover group for load-balancing purposes, so that, for example, if a particular traffic director instance fails then the VIPs enabled on that traffic director instance can be failed-over to another member within the failover group. Since the application-to-application communication can utilize a same host and port, e.g., a same VIP, on each of a first and second web host, any failover of an application host or traffic director instance will be transparent from the application's perspective. Similarly, any newly-added application can be configured to use the same VIP to send application-to-application requests, which allows new applications to be easily added to the environment.

Figure 1:
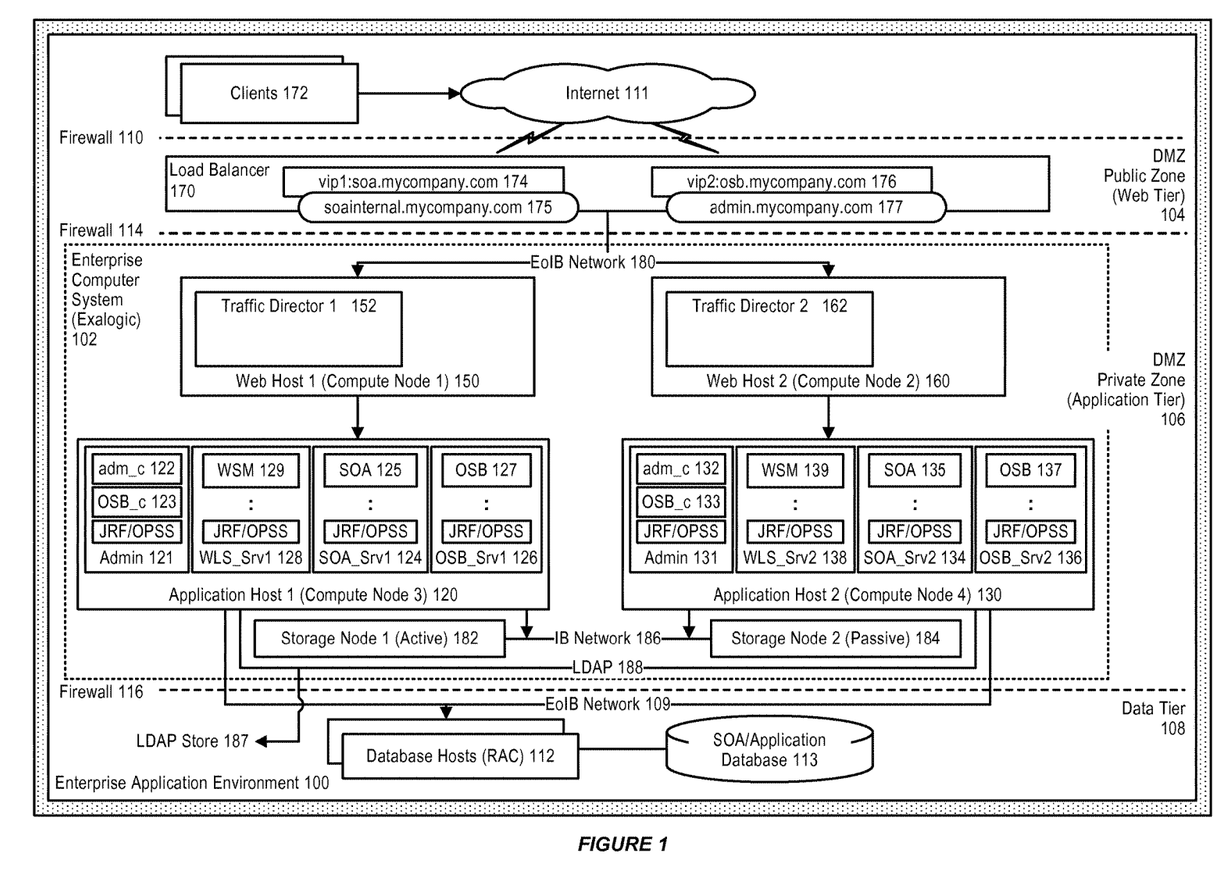
FIG. 1 illustrates a system that supports hosted applications in an enterprise computer system or middleware machine environment, in accordance with an embodiment.

FIG. 1 illustrates a system that supports hosted applications in an enterprise computer system or middleware machine environment, in accordance with an embodiment.

As shown in FIG. 1, in accordance with an embodiment, an enterprise application environment 100 (in this example, a SOA application environment, although in accordance with various embodiments, other types of managed server and hosted application environments can be supported) can be deployed to an enterprise computer system 102, for example an Exalogic middleware machine, which includes a plurality of hard-wired processing nodes, illustrated in this example as compute nodes 1 through 4.

In accordance with an embodiment, a DMZ is configured with a DMZ public zone 104, for example a web tier which includes a plurality of external server or load balancer components which external clients can access, and which interacts with an application tier and application servers in a DMZ private zone 106.

A firewall 110 can be used to restrict access from the outside world via the Internet 111. Additional firewalls 114, 116 can be used to restrict access to servers and services below each zone.

A data tier 108 can provide access via an EoIB network 109 to one or more database hosts 112 (e.g., an Oracle RAC database), and/or a SOA/application database 113.

In accordance with an embodiment, software applications can be deployed to the application tier as hosted applications. For example, a plurality of application hosts, such as application host 1 (120) and application host 2 (130), can be deployed to the compute nodes and associated with EoIB addresses that allow access to the RAC database.

Each application host can include a plurality of server instances such as, for example, an admin server instance 121, 131, having admin consoles 122, 132 and OSB consoles 123, 133; a SOA server instance 124, 134 having SOA or other applications 125, 135; an OSB server instances 126, 136 having OSB functionality 127, 137; and a Weblogic or other application server instance 128, 138 having web services 129, 139. In accordance with various embodiments, other types of server instances can be used. Each server instance can use, for example, Java Required Files (JRF) Libraries and Oracle Platform Security Services (OPSS), to enable the server instance to run within the application host.

In accordance with an embodiment, a plurality of web hosts 150, 160 can be similarly deployed to compute nodes, and can be configured with traffic director instances 152, 162, and assigned EoIB addresses that are accessible from the external load balancer. Generally, those addresses associated with the traffic director instance are the only addresses that are accessible from the DMZ public zone. Communication between the traffic director instances and the application tier can be provided via an IB internal network fabric.

In accordance with an embodiment, the external load balancer 170 receives requests from external clients 172, for example via URL's 174, 175, 176 and 177 such as those described below, for communication to the application hosts via the EoIB network 180. Each of the web hosts can be associated with one or more, e.g., ZFS, storage nodes 182, 184, operating either in an active or passive mode and connected via an IB network 186. Each web host can also communicate with an LDAP store 187 using LDAP 188.

Figure 2:
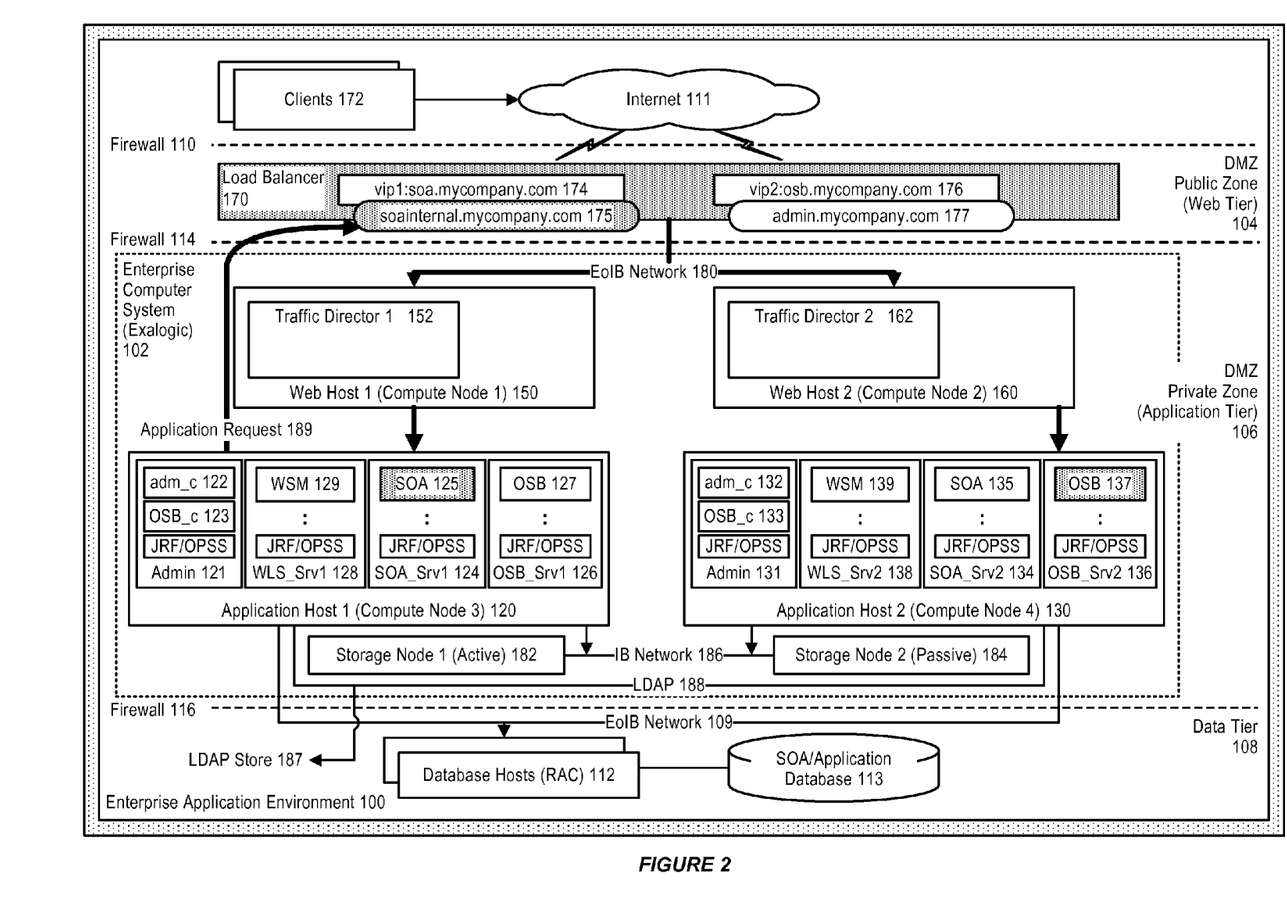
FIG. 2 further illustrates a system that supports hosted applications in an enterprise computer system or middleware machine environment, in accordance with an embodiment.

However, as illustrated in FIG. 2, a problem with such a setup is that, when an application at a first application host, in this example, SOA application 125 at application host 1 (shaded) makes a request to another application potentially at another application host, for example, OSB 137 at application host 2 (shaded), which is beyond the confines of a particular traffic director/application host partition, then the application request 189 must be directed via the external load balancer, which then forwards it to the appropriate destination node via the EoIB network, according to the configuration of the load balancer. This need to communicate the requests via the external load balancer and the EoIB network negatively impacts the speed with which hosted applications can communicate with one another, and reduces overall system performance.

Figure 3:
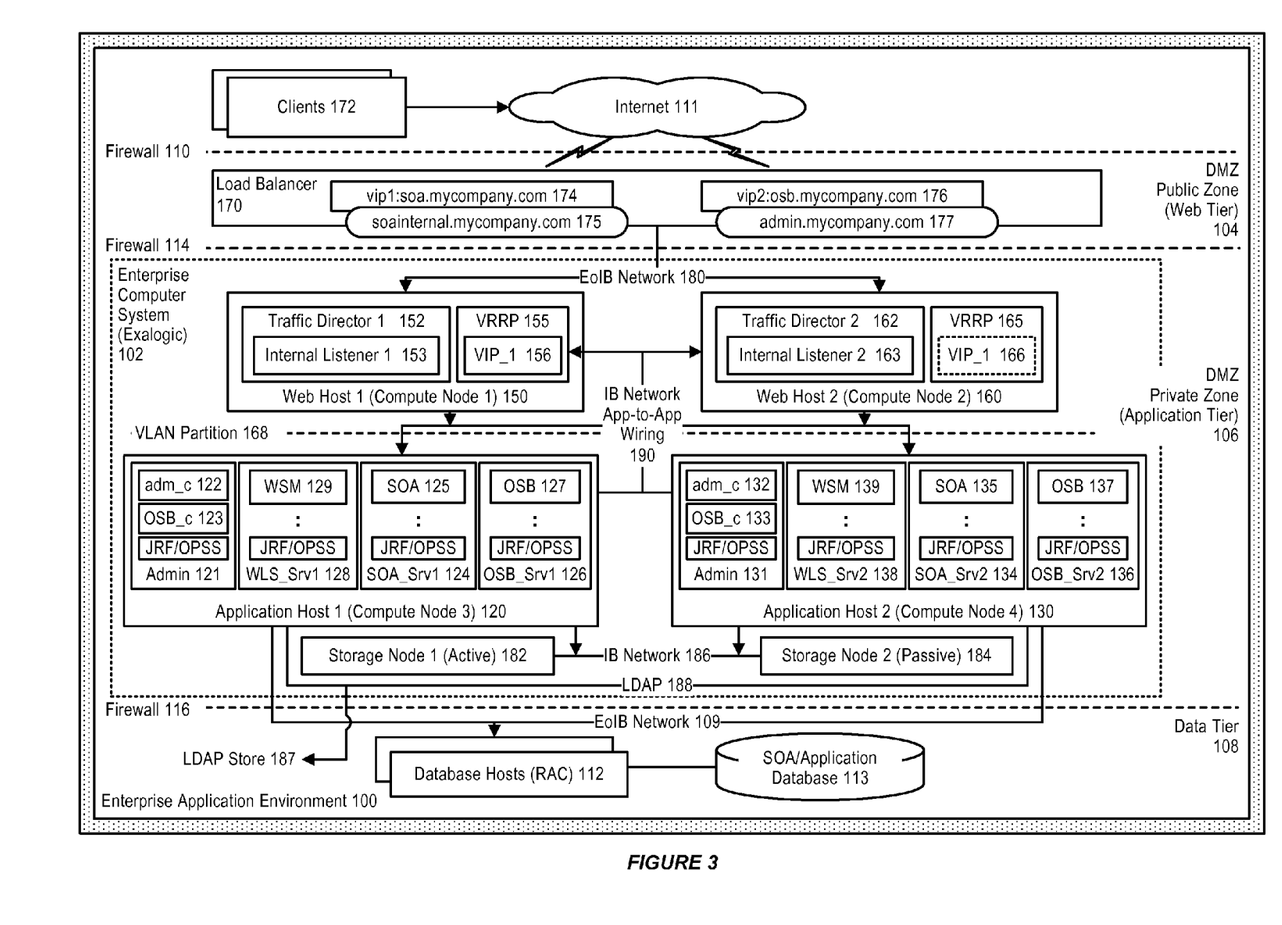
FIG. 3 illustrates application-to-application communication in an enterprise computer system or middleware machine environment, in accordance with an embodiment.

FIG. 3 illustrates application-to-application communication in an enterprise computer system or middleware machine environment, in accordance with an embodiment.

In accordance with an embodiment, application-to-application wiring avoids the need to communicate internal application requests via the external load balancer. Communications from external clients are received at the external load balancer on port 80, and are redirected to port 443 for use within the system, where they are then routed to traffic director instances via EoIB over a non-secure port 7777.

Virtual servers and associated ports can be configured on the external load balancer for use with different types of network traffic and monitoring, and can be configured to appropriate real hosts and ports for the services, and monitored for availability so that traffic to these hosts and ports is stopped when a service is down. Some examples of virtual server URLs include:

soa.mycompany.com: a virtual server name that acts as the access point for external HTTP traffic to runtime SOA components. Clients access this service using the address soa.mycompany.com:443.

admin.mycompany.com: a virtual server name that acts as the access point for internal HTTP traffic that is directed to administration services such as administrative console. Clients access this service using the address admin.mycompany.com:80 and the requests are forwarded to port 7777 on web hosts 1 and 2.

osb.mycompany.com: a virtual server name that acts as the access point for HTTP traffic to runtime OSB resources and proxy services. Clients access this service using the address osb.mycompany.com:443.

soainternal.mycompany.com: a virtual server name that is used for internal invocations of SOA services. Clients access this service using the address soainternal.mycompany.com:80. Invocations like callbacks and internal Web Services, however, use a virtual IP address in the traffic director for optimized performance on InfiniBand.

In accordance with an embodiment, each of the web host and traffic director instances can include an EoIB address that is accessible from the external load balancer. Managed server instances, such as SOA Servers, can also be accessed externally for some invocations, such as RMI/JMS/T3 invocations.

For internal invocations, such as internal JMS destination routing, and RMI interactions originating within the system (e.g., within the middleware machine or rack), the application hosts can use an IPoIB VIP address as their main listen address, enabling communication and routing between the traffic director instances and the application tier to be via IPoIB. Any front-end address that is exposed only for internal consumption, can also use an IPoIB VIP on the traffic director.

In accordance with an embodiment, the traffic director instances receive requests coming in from the external load balancer over EoIB at the URLs described above, and route those requests over IPoIB to an appropriate application host compute node on the application tier. Additionally they can also route over IPoIB some types of requests from the application tier components to other application tier components, including JMS (RMI) traffic such as callbacks and internal Web services invocations, and other internal application-to-application requests to be routed over the internal IPoIB network via a VIP.

In accordance with an embodiment, the traffic directors can also act as external load balancers. For example, in accordance with an embodiment, each traffic director can distribute the requests that it receives from clients, based on one or more load-balancing methods, or can route the requests based on specified rules, cache frequently accessed data, prioritize traffic, and generally control the quality of service.

In accordance with an embodiment, the traffic director instances can be configured as part of a failover group. For example, the traffic directors can use an implementation of the Linux Virtual Routing Redundancy Protocol (VRRP) to provide failover capabilities. If a particular traffic director instance fails, then its VIPs are migrated to surviving instances, using VRRP.

For example, as shown in FIG. 3, each traffic director can be associated with an internal listener 153, 163, and VRRP 155, 165, which enables creation of a virtual LAN (VLAN) 168, including a unique virtual IP address (VIP) 156, 166, and which provides support for traffic director load-balancing and failover.

By combining two traffic director instances in a failover group represented by one or two virtual IP (VIP) addresses, an active-passive failover group can be created for the IP address, including a primary and a number of secondary instances.

In accordance with an embodiment, for all communications over the IPoIB network, the web host compute nodes and managed servers can use a default bond0 interface together with the virtual IP address assigned to this interface by default when the enterprise system hardware and software is first set up.

In accordance with an embodiment, application hosts and servers can use an IB address as listen addresses for internal invocations, such as JMS and RMI interactions. In this manner, internal application-to-application requests, which are routed only over the internal IB network, can be routed via the virtual IP address at each traffic director instance, using app-to-app wiring 190.

When a request is sent to one of the virtual hosts admin.mycompany.com, osb.mycompany.com, and soa.mycompany.com, the front end external load balancer redirects the request to the IP addresses it has been configured to load balance requests to. This IP address is enabled on one of the traffic director instances but can be "migrated" to another OTD instance should a failure occur. Instead of application-to-application communications being communicated via the external load balancer, the communications can be load-balanced within the e.g., Exalogic rack itself.

In accordance with an embodiment, a measure of security can be provided by assigning listeners within the traffic director that are visible only from, e.g., external requests, or internal requests, as appropriate. Each listener can have an IP address that is visible from the external load balancer, and a different IP address that is visible from the internal SOA hosts. This allows each host to operate within a different network separate by the VLAN.

Figure 4:
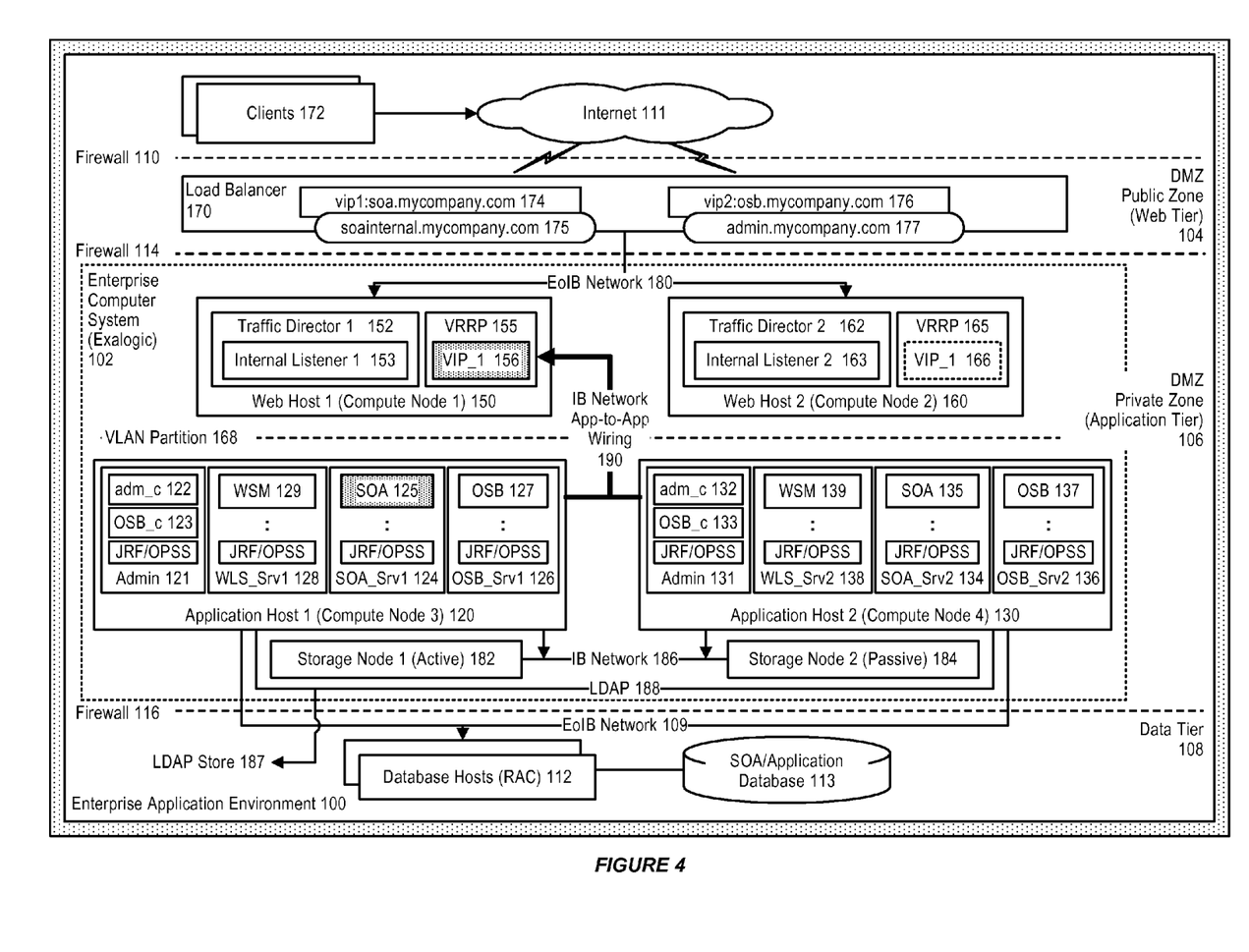
FIG. 4 further illustrates application-to-application communication, in accordance with an embodiment.

FIG. 4 further illustrates application-to-application, in accordance with an embodiment. As shown in FIG. 4, when an application, such as SOA application 125 at application host 1 (shaded) makes a request, e.g., to an OSB application at application host 2, the request can be communicated to VIP 1 at web host 1 (shaded), for communication by its traffic director instance via the application-to-application wiring.

Figure 5:
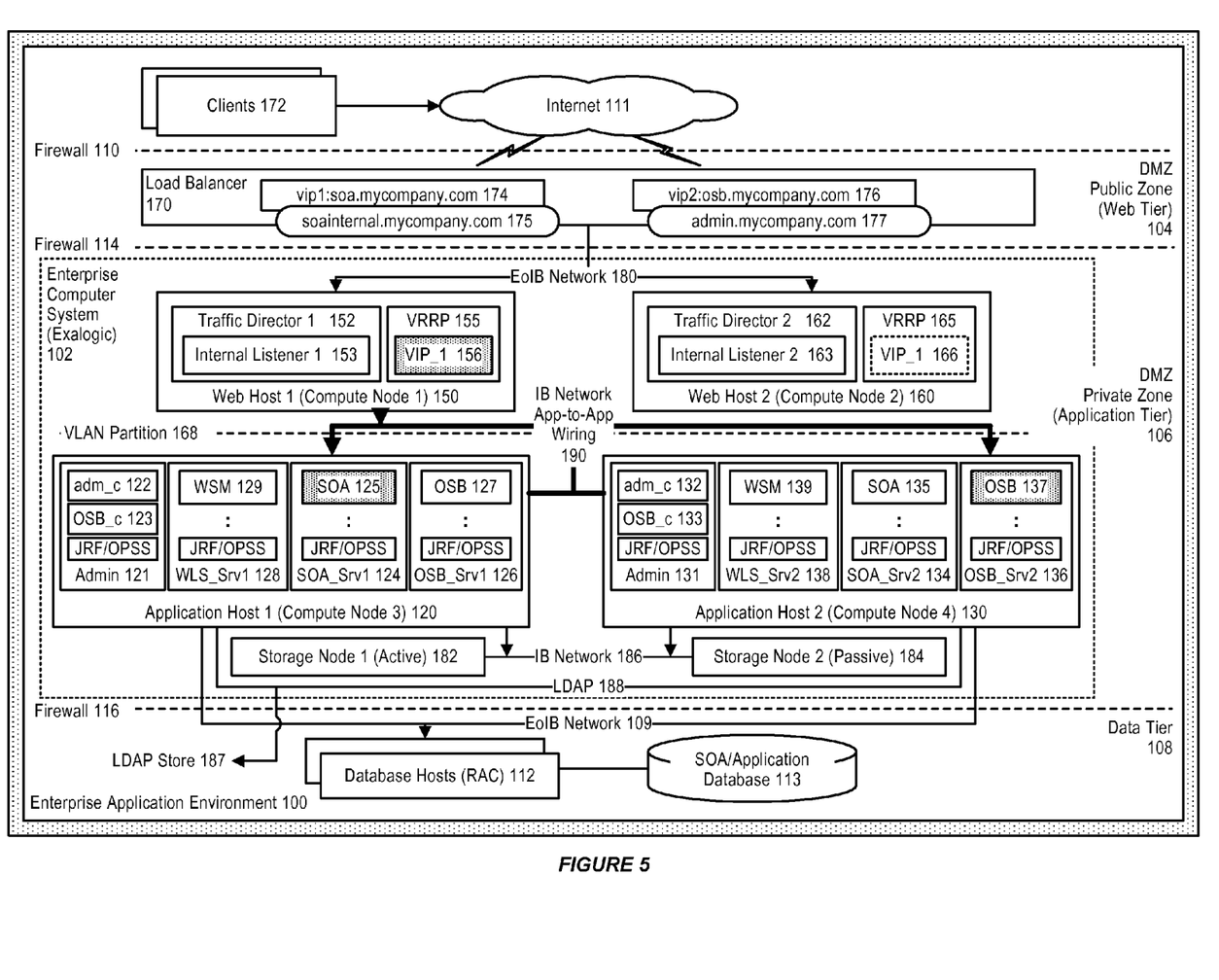
FIG. 5 further illustrates application-to-application communication, in accordance with an embodiment.

FIG. 5 further illustrates application-to-application communication, in accordance with an embodiment. As shown in FIG. 5, the internal listener at web host 1 can receive the request and determine which of OSB 127 or 137 to direct the request, and in this example, ultimately to route the request to OSB 137 at application host 2 (shaded).

Figure 6:
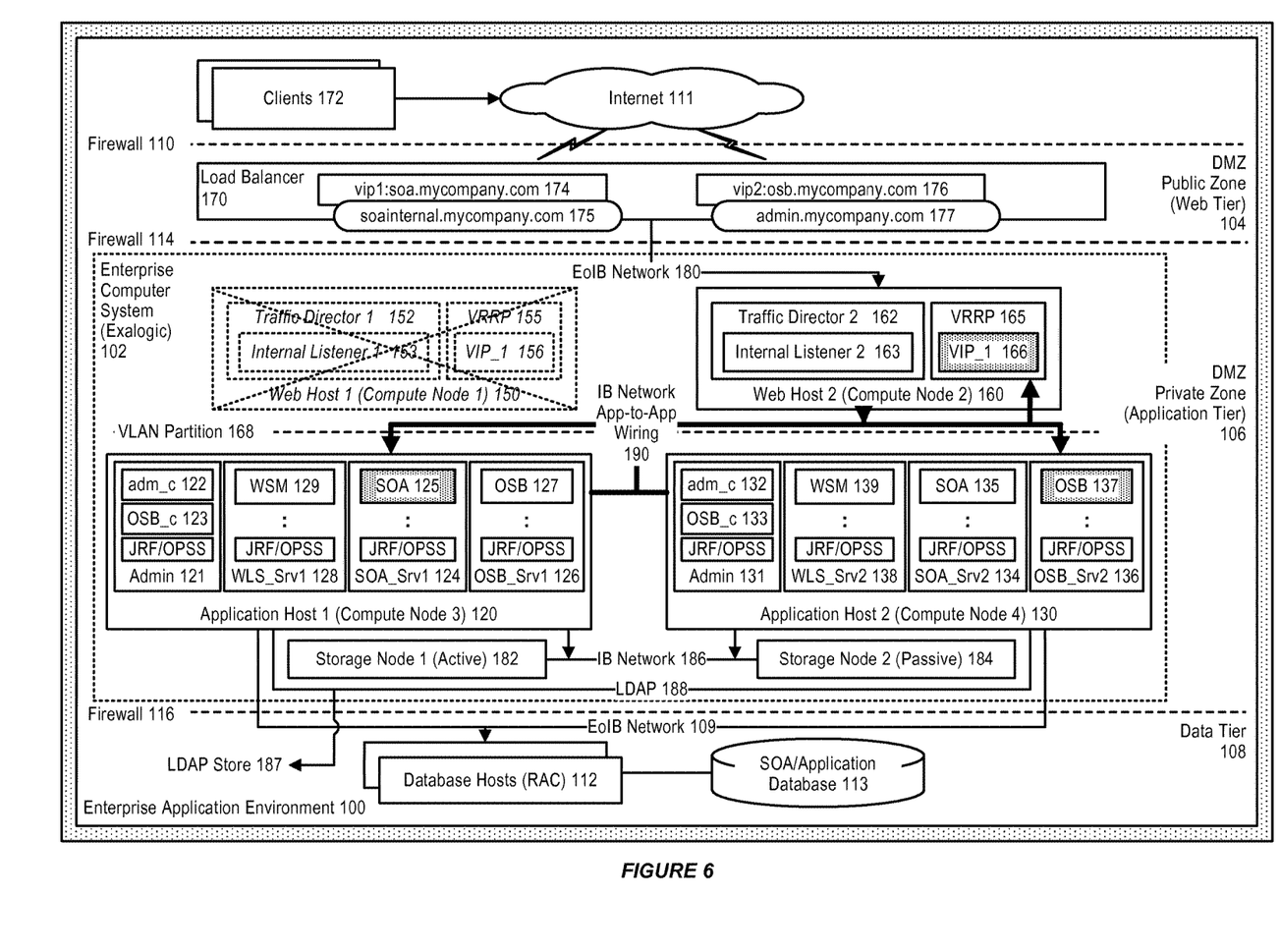
FIG. 6 further illustrates application-to-application communication, in accordance with an embodiment.

FIG. 6 further illustrates application-to-application communication, in accordance with an embodiment. As shown in FIG. 6, if web host 1 fails (as illustrated by the dashed lines), then any VIP which is enabled at that host can instead be enabled at a failover group member, for example, web host 2, as a replacement VIP 1 (shaded), and its traffic director and internal listener can continue to receive requests, for direction to hosted applications as appropriate.

Figure 7:
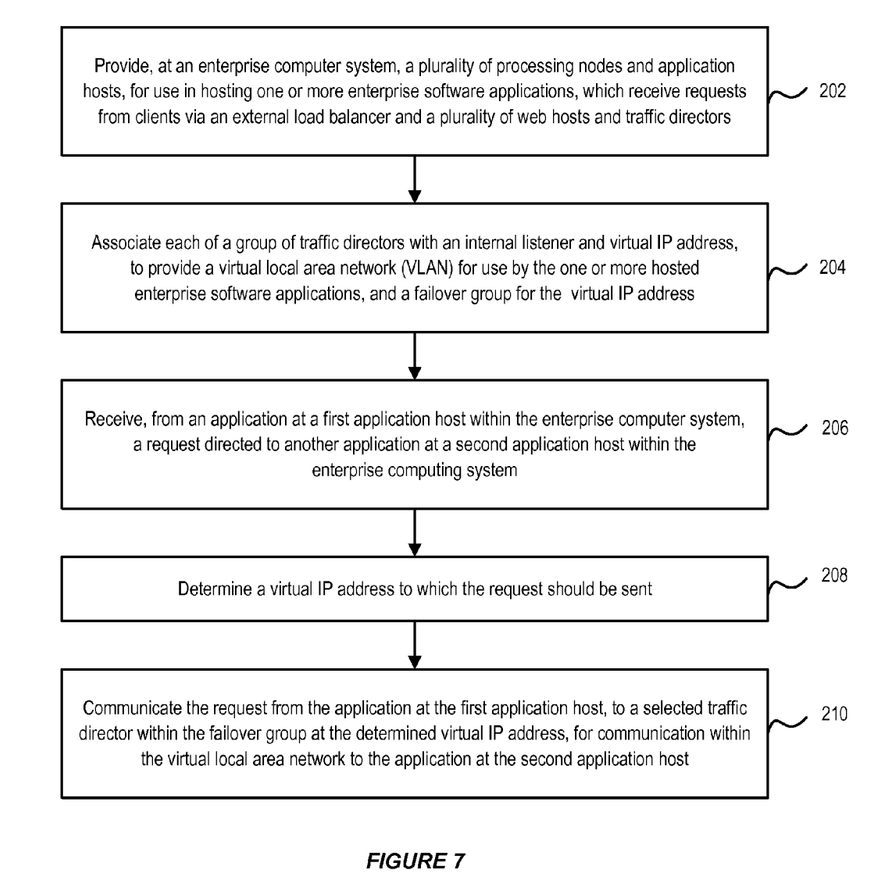
FIG. 7 illustrates a method for enabling application-to-application communication, in accordance with an embodiment.

FIG. 7 illustrates a method for enabling application-to-application communication in an enterprise computer system or middleware machine environment, in accordance with an embodiment.

As shown in FIG. 7, at step 202, a plurality of processing nodes and application hosts are provided at an enterprise computer system, for use in hosting one or more enterprise software applications, wherein the application hosts receive requests from clients via an external load balancer and a plurality of web hosts and traffic directors.

At step 204, each of a group of traffic directors are associated with an internal listener and virtual IP address, to provide a virtual local area network (VLAN) for use by the one or more hosted enterprise software applications, and optionally a failover group for the virtual IP address.

At step 206, a request is received from an application at a first application host within the enterprise computer system, wherein the request is directed to another application at a second application host within the enterprise computing system.

At step 208, a virtual IP address, to which the request should be sent, is determined.

At step 210, the request is communicated from the application at the first application host, to a selected traffic director within the failover group at the determined virtual IP address, for communication within the virtual local area network to the application at the second application host.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for enabling application-to-application communication in an enterprise computer or middleware machine environment, comprising:
   an enterprise computer environment, including one or more processors, a plurality of web hosts, and a plurality of application hosts, wherein the web hosts and the application hosts are configured to communicate with one another via an internal network within the enterprise computer environment; a first application executing on a first of the plurality of application hosts, and a second application executing on a second of the plurality of application hosts;
   a traffic director instance on a particular web host, wherein the traffic director instance is associated with a virtual IP address, and provides a virtual local area network (VLAN) for use by the first application and the second application;
   wherein a request made by the first application to the second application are communicated to the traffic director instance via the virtual IP address; and
   wherein the traffic director instance operates to locate the second application within the VLAN, and communicate the request to the second application;
   wherein the application hosts include a first managed server and a second managed server, and wherein the applications at the application hosts include a service-oriented architecture application on the first managed server, and an enterprise service bus application on the second managed server.

2. The system of claim 1,
   wherein the middleware machine environment receives requests from an external load balancer traffic director instances a first network fabric; wherein the first application and the second application communicate with each other via the traffic director instance using the virtual IP address and a second network fabric; and
   wherein the VLAN within the second network fabric is created using a virtual routing redundancy protocol, an internal listener within the traffic director instance, and the virtual IP address.

3. The system of claim 2, wherein each of the plurality of traffic director instances includes a virtual IP address.

4. The system of claim 1, wherein the communications between the service-oriented architecture application and the enterprise service bus application does not go through the external load balancer, and are not load-balanced.

5. The system of claim 1, wherein the communications between the service-oriented architecture application and the enterprise service bus application is performed through an application-to-application wiring.

6. The system of claim 1, wherein the plurality of traffic director instances are in a failover group, and wherein when the particular traffic director instance fails, the associated virtual IP address is migrated to another traffic director instance in the failover group.

7. A method for enabling application-to-application communication in an enterprise computer or middleware machine environment, comprising:
   providing an enterprise computer environment, including one or more processors, a plurality of web hosts, and a plurality of application hosts, wherein the web hosts and the application hosts are configured to communicate with one another via an internal network within the enterprise computer environment; executing a first application on a first of the plurality of application hosts, and executing a second application on a second of the plurality of application hosts;
   providing a traffic director, instance on a particular web host, wherein the traffic director instance is associated with a virtual IP address, and provides a virtual local area network (VLAN) for use by the first application and the second application;
   communicating a request made by the first application to the second application to the traffic director instance via the virtual IP address; and
   wherein the traffic director instance operates to locate the second application within the VLAN, and communicate the request to the second application;

wherein the application hosts include a first managed server and a second managed server, and wherein the applications at the application hosts include a service-oriented architecture application on the first managed server, and an enterprise service bus application on the second managed server.

8. The method of claim 7, wherein the middleware machine environment receives requests from an external load balancer traffic director instances a first network fabric; wherein the first application and the second application communicate with each other via the traffic director instance using the virtual IP address and a second network fabric; and wherein the VLAN within the second network fabric is created using a virtual routing redundancy protocol, an internal listener within the traffic director instance, and the virtual IP address.

9. The method of claim 8, wherein each of the plurality of traffic director instances includes a virtual IP address.

10. The method of claim 7, wherein the communications between the service-oriented architecture application and the enterprise service bus application does not go through the external load balancer, and are not load-balanced.

11. The method of claim 7, wherein the communications between the service-oriented architecture application and the enterprise service bus application is performed through an application-to-application wiring.

12. The method of claim 7, wherein the plurality of traffic director instances are in a failover group, and wherein when the particular traffic director instance fails, the associated virtual IP address is migrated to another traffic director instance in the failover group.

13. A non-transitory computer readable storage medium, including instructions stored thereon which when read and executed by one or more computers cause the one or more computers to perform the steps comprising:

providing an enterprise computer environment, including one or more processors, a plurality of web hosts, and a plurality of application hosts, wherein the web hosts and the application hosts are configured to communicate with one another via an internal network within the enterprise computer environment; executing a first application on a first of the plurality of application hosts, and executing a second application on a second of the plurality of application hosts;

providing a traffic director, instance on a particular web host, wherein the traffic director instance is associated with a virtual IP address, and provides a virtual local area network (VLAN) for use by the first application and the second application;

communicating a request made by the first application to the second application to the traffic director instance via the virtual IP address; and wherein the traffic director instance operates to locate the second application within the VLAN, and communicate the request to the second application;

wherein the application hosts include a first managed server and a second managed server, and wherein the applications at the application hosts include a service-oriented architecture application on the first managed server, and an enterprise service bus application on the second managed server.

14. The non-transitory computer readable storage medium of claim 13, wherein the middleware machine environment receives requests from an external load balancer traffic director instances a first network fabric; wherein the first application and the second application communicate with each other via the traffic director instance using the virtual IP address and a second network fabric; and wherein the VLAN within the second network fabric is created using a virtual routing redundancy protocol, an internal listener within the traffic director instance, and the virtual IP address.

15. The non-transitory computer readable storage medium of claim 14, wherein each of the plurality of traffic director instances includes a virtual IP address.

16. The non-transitory computer readable storage medium of claim 13, wherein the communications between the service-oriented architecture application and the enterprise service bus application does not go through the external load balancer, and are not load-balanced.

17. The non-transitory computer readable storage medium of claim 13, wherein the communications between the service-oriented architecture application and the enterprise service bus application is performed through an application-to-application wiring.

* * * * *